United States Patent
Zhou (10) Patent No.: US 10,063,803 B2
(45) Date of Patent: Aug. 28, 2018

(54) VIDEO PLAYBACK METHOD, DEVICE, AND SYSTEM

(71) Applicant: TENCENT TECHNOLOGY (SHENZHEN) COMPANY LIMITED, Shenzhen (CN)

(72) Inventor: Bin Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/173,869

(22) Filed: Jun. 6, 2016

(65) Prior Publication Data

US 2016/0337609 A1 Nov. 17, 2016

Related U.S. Application Data

(63) Continuation of application No. PCT/CN2015/072613, filed on Feb. 10, 2015.

(30) Foreign Application Priority Data

Dec. 10, 2013 (CN) .......................... 2013 1 0666379

(51) Int. Cl.
*H04N 5/775* (2006.01)
*H04N 5/445* (2011.01)
(Continued)

(52) U.S. Cl.
CPC ......... *H04N 5/44591* (2013.01); *G11B 27/00* (2013.01); *H04N 9/8715* (2013.01);
(Continued)

(58) Field of Classification Search
CPC ........................... H04N 5/44591; G11B 27/00
See application file for complete search history.

(56) References Cited

U.S. PATENT DOCUMENTS

| 8,166,420 B2 | 4/2012 | Sato |
| 2009/0089712 A1 | 4/2009 | Sato |
| 2013/0004138 A1* | 1/2013 | Kilar .................. H04N 21/4756 386/230 |

FOREIGN PATENT DOCUMENTS

| CN | 101080017 A | 11/2007 |
| CN | 101382867 | * 3/2009 |

(Continued)

OTHER PUBLICATIONS

Search Report in International Application No. PCT/CN2015/072613 dated May 12, 2015, 4 pages.
(Continued)

*Primary Examiner* — Hung Dang
*Assistant Examiner* — Girumsew Wendmagegn
(74) *Attorney, Agent, or Firm* — Anova Law Group, PLLC (57) ABSTRACT

Embodiments of the present invention provide a method, apparatus and storage medium for playing video. The method comprises: providing a video playing interface; determining a first display area and a second display area in the video playing interface; generating a surface around the first display area or around the second display area; acquiring a video file, additional media information related to the video file, and a surface component related to a relationship chain; playing the video file in the first display area, displaying the additional media information related to the video file in the second display area, and displaying the surface component in the surface.

13 Claims, 7 Drawing Sheets

(51) Int. Cl.
  *H04N 21/432* (2011.01)
  *H04N 21/431* (2011.01)
  *H04N 9/87* (2006.01)
  *H04N 21/4788* (2011.01)
  *H04N 21/81* (2011.01)
  *H04N 21/4722* (2011.01)
  *H04N 21/845* (2011.01)
  *H04N 21/8549* (2011.01)
  *G11B 27/00* (2006.01)

(52) U.S. Cl.
  CPC ..... *H04N 21/4312* (2013.01); *H04N 21/4316* (2013.01); *H04N 21/4325* (2013.01); *H04N 21/4722* (2013.01); *H04N 21/4788* (2013.01); *H04N 21/812* (2013.01); *H04N 21/8133* (2013.01); *H04N 21/8456* (2013.01); *H04N 21/8549* (2013.01)

(56) References Cited

FOREIGN PATENT DOCUMENTS

| | | |
|---|---|---|
| CN | 101382867 A | 3/2009 |
| CN | 102426685 A | 4/2012 |
| CN | 102630048 A | 8/2012 |

OTHER PUBLICATIONS

International Preliminary Report on Patentability and Written Opinion in International Application No. PCT/CN2015/072613 dated Jun. 14, 2016, 11 pages.

Office Action from Chinese Application No. 2013106666379.5 dated Jun. 19, 2017.

* cited by examiner

VIDEO PLAYBACK METHOD, DEVICE, AND SYSTEM

CROSS REFERENCE

This application is continuation of international application No. PCT/CN2015/072613, filed on Feb. 10, 2015, which claims to the benefit of Chinese Patent Application No. 201310666379.5, filed on Dec. 10, 2013, which is hereby incorporated by reference in its entirety.

FIELD

The present disclosure relates to information processing technologies, more particularly to, a method, apparatus and storage medium for playing video.

BACKGROUND

Along with development of computer technologies and network technologies, Internet and instant communication technologies are playing more and more important roles in people's daily life. And with development of mobile Internet, Internet is increasingly mobile.

In current solutions for video promotion, the video promotion carriers (e.g., web portals or video websites) are required to insert a script of a video file in the webpage or a video player. When a user views a webpage or a video, the webpage or the video player may automatically acquire a matched video file, display content of the video file according to a designated playing mode, and report a video exposure rate to the server.

SUMMARY

Embodiments of the present disclosure provide a method for playing video, so as to improve the efficiency of playing video.

Embodiments of the present disclosure also provide an apparatus for playing video, so as to improve the efficiency of playing video.

A method for playing video, comprising:
providing a video playing interface;
determining a first display area and a second display area in the video playing interface;
generating a surface around the first display area or around the second display area;
acquiring a video file, additional media information related to the video file, and a surface component related to a relationship chain;
playing the video file in the first display area, displaying the additional media information related to the video file in the second display area, and displaying the surface component in the surface.

A device, comprising one or more processors, and a memory for storing instructions to be executed by the one or more processors, wherein the instructions are configured to:
acquire a video file, additional media information related to the video file, and a surface component related to a relationship chain;
determine a first display area and a second display area in the video playing interface;
provide a video playing interface, play the video file in the first display area, and display the additional media information related to the video file in the second display area;
generate a surface around the first display area or around the second display area, and display the surface component in the surface.

Embodiments of the present disclosure also provide a storage medium, configured to store computer-executable instructions to implement the above-described method for playing video.

DETAILED DESCRIPTION OF THE INVENTION

The inventors found that there are some problems in the current solutions for video promotion: the time for playing video is much long, but if the time for playing video is shortened, the video exposure rate may be affected. And the form for displaying video is limited, so the video playing efficiency becomes low.

In order to make the object, technical solution and merits of the present invention clearer, the present invention will be illustrated in detail hereinafter with reference to the accompanying drawings and specific examples.

Figure 1A:
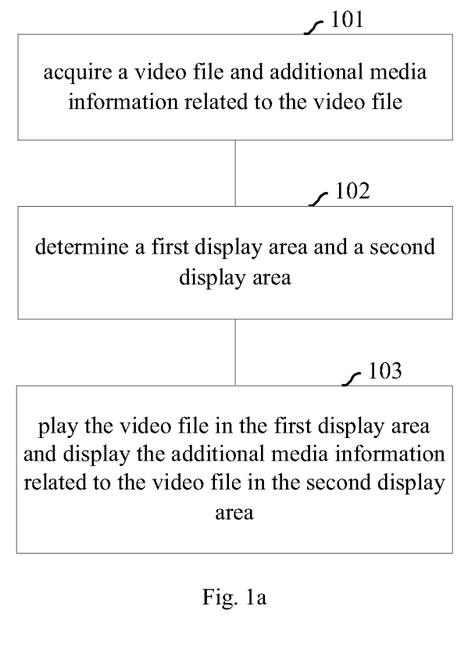
FIG. 1a is a schematic flowchart illustrating a method for playing video according to various embodiments of the present disclosure.

FIG. 1a is a schematic flowchart illustrating a method for playing video according to various embodiments of the present disclosure. As shown in FIG. 1a, the method includes the following processing.

In block 101, acquire a video file and additional media information related to the video file.

According to an embodiment, the video file may be acquired from various video file providers. For example, the video file may be Internet medium information in a video form, e.g., an Internet video advertisement.

In addition, the additional media information related to the video file may also be acquired. For example, the additional media information related to the video file may be acquired from the video file providers, or the additional media information related to the video file may be generated locally by the terminal used for playing the video file.

A video-file source user refers to a user which provides the video file. For example, regarding the video file in a form of an Internet video advertisement, the video-file source user may be an Internet advertiser.

The additional media information related to the video file may be in various forms, for example, an introduction text or an introduction image with respect to the content of the video file, or a set of thumbnails of the video file, etc.

In block 102, determine a first display area and a second display area.

According to an embodiment, the first display area and the second display area may be determined by the local terminal. For example, a video playing interface is provided in the display screen of the local terminal, and then the first display area and the second display area are determined in the video playing interface. According to an embodiment, the second display area is located around the first display area. For example, the second display area is located on the right of the first display area; or, the second display area is located on the left of the first display area; or, the second display area is located above the first display area; or, the second display area is located below the first display area, etc.

In block 103, play the video file in the first display area and display the additional media information related to the video file in the second display area.

The video file may be displayed in the first display area, and the additional media information related to the video file may be displayed in the second display area. For example, the video file may be displayed in the first display area by using a video player.

According to an embodiment, after the video file is played in the first display area, the additional media information related to the video file may be displayed in the second display area. In this way, even after the video file is played, the additional media information related to the video file can also be exposed, so that the exposure time can be increased.

According to an embodiment, when the video file is played in the first display area, the additional media information related to the video file may be displayed in the second display area at the same time. In this way, while the video file is played, the additional media information related to the video file can be further exposed, so that the exposure effects can be increased.

According to an embodiment, before the video file is played in the first display area, the additional media information related to the video file may be displayed in the second display area. In this way, before the video file is played, the additional media information related to the video file is already started to be exposed, so that the exposure efficiency of the video file can be increased.

In conventional video medium promotion, most of the video files to be played are in a file format of flv or swf. But in mobile video medium promotion, due to some factors including network, most of the video files to be played are in a format of streaming media file, e.g., a gif dynamic picture, 3gp, mp4. In conventional video medium promotion, medium promotion may be in a form of a pre-video advertisement, or a post-video advertisement, or after the video pauses, etc. In mobile video medium promotion, the video may be inserted and played during the "fragmented time" when the user starts or exits the mobile application by using a mobile phone.

According to an embodiment, the method may further includes: acquiring a surface component related to a relationship chain; generate a surface around the first display area, and display the surface component in the surface. The surface component may include at least one of the following information: an identifier of the video file; a two-dimensional code; promotion information; page connection information of a microblog activity; a control related to a relationship chain, relationship chain information related to the video file, etc.

The control related to a relationship chain may include at least one of the following: a trigger control for forwarding to a friend; a control for receiving a friend's comments; a control for reminding a friend to attention; a control for displaying the number of being forwarded, etc. In this way, by configuring a control related to the relationship chain in the surface component, it enables the user to forward the video file to other friends, so as to facilitate the propagation and diffusion of the video file.

Those skilled in the art may appreciate that, the above-described examples for generating a surface around the first display area is only for illustration purpose, which does not cause any limitation to the present disclosure.

According to an embodiment, a surface may be generated around the first display area or around the second display area for displaying relationship chain information. The relationship chain information may include attribute information, and participation and attention information of a friend of the video-file source user, wherein the attribute information may include: an identifier (ID), a nickname, and an avatar of a video-file source user, an ID, a nickname, and an avatar of a friend of the video-file source user, etc.

For example, the relationship chain information of a video-file source user, and/or, the relationship chain information of an activity initiated by a video-file source user may be acquired from a backend server by invoking an Application Program Interface (API).

A video-file source user refers to the user which provides the video file. For example, regarding the video file in a form of an Internet video advertisement, the video-file source user may be an Internet advertiser. The video-file source user may initiate multiple activities, and each activity may have a corresponding relationship chain.

For example, a surface for displaying relationship chain information may be generated below the first display area or below the second display area, and then in the surface for displaying relationship chain information, some video file edit information may be displayed, such as a user's avatar, a user's comments, etc. The relationship chain information may be displayed dynamically in a format of a marquee, or the relationship chain information may be updated and displayed according to a pre-determined period.

According to an embodiment, the video file may include at least two video sub-segments with an ordinal relation.

Playing the video file in the first display area and displaying the additional media information related to the video file in the second display area includes:

playing the video sub-segments in the entire first display area according to the ordinal relation; displaying the additional media information related to the video sub-segments according to the ordinal relation in the second display area; after all the video sub-segments are played in the first display area, displaying the additional media information related to the video sub-segments circularly according to the ordinal relation in the entire second display area.

According to an embodiment, correspondence between the video sub-segments and the additional media information related to the video sub-segments may be acquired from the server. Thus, the additional media information related to each video sub-segment may be determined according to the acquired correspondence.

According to an embodiment, the second display area may be a banner picture displaying area. The additional media information related to each video sub-segment may be a banner picture. For example, the time for promoting a video medium according to the prior art (e.g. playing time is 15 seconds) is divided into n video sub-medium (e.g., n=3, playing time for each sub-medium is 5 seconds), in order to reduce the cost and decrease the waiting time for the user. In addition, after each video sub-medium is played within 5 seconds, a new banner picture displaying area is added around the displaying area for promoting a video medium. The content displayed in the banner picture displaying area and the content of the promoted video sub-medium are about the same subject. Because the speed for promoting the video sub-medium is high, when the viewer wants to know more content about the viewed interesting sub-medium, a banner picture added correspondingly may be helpful to learn more details, and the click rate may be improved.

For example, the video provider may upload n video sub-medium materials in the video platform; at the same time, upload a banner picture corresponding to each video sub-medium material, record the correspondence between the banner picture and the video sub-medium material in the database, and determine the priority for displaying the materials.

After the video sub-medium materials and banner pictures are approved by verification, a request for playing a video sub-medium and its corresponding banner picture may be initiated by the player at an appropriate occasion in the video website. When the viewer checks the video, the player may send a first request for content of the video sub-medium, and at the same time send a second request for a banner picture corresponding to the video sub-medium to the server (those two kinds of requests may be sent out at a same request link). The backend server may select a video sub-medium according to the first request, determine according to the second request whether the selected video sub-medium corresponds to a banner picture which has been configured, if yes, send both the video sub-medium and its corresponding banner picture to the player.

In an implementation, the player plays a pre-video advertisement, i.e., 3 flv materials, each with duration of 5 seconds, respectively; at the same time, when the player plays each 5-second material, if the pre-video advertisement corresponds to banner pictures, the player expands a banner picture display area or a banner player to play the corresponding banner picture. The content of the banner picture may be the similar to or complementary to the content of the 5-second material played as the pre-video advertisement. If the viewer feels interested in the 5-second material, when playing of the 5-second material is over, there is no additional place to check the content which the viewer was interested in, the chance to click this material may be lost. Hence, when the flv material ends playing, the banner picture with similar content is displayed additionally in order to increase the click rate. After the pre-video advertisement is played, the banner pictures may be played circularly on the right of the player, and each is remained for 5 seconds. If one banner picture is not good for the viewer, a close button may be provided for the viewer to close the banner picture display area on the right. The banner picture display area may be displayed in a form of a surface around the player for playing the pre-video advertisement.

According to an embodiment, the second display area is around the first display area. The additional media information related to the video file includes: text information and/or image information related to the video file.

Displaying the additional media information related to the video file in the second display area includes: generating a surface in the second display area; displaying the additional media information related to the video file in the surface.

Figure 2:
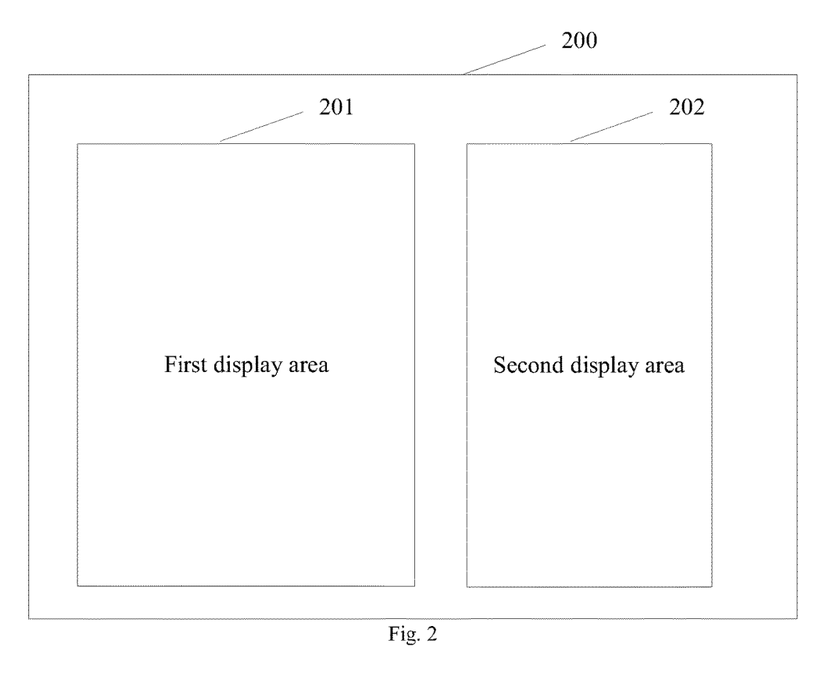
FIG. 2 is a schematic diagram illustrating playing video according to various embodiments of the present disclosure.

FIG. 2 is a schematic diagram illustrating playing video according to various embodiments of the present disclosure.

As shown in FIG. 2, the first display area 201 and the second display area 202 are arranged in parallel within the video playing interface 200, and the second display area 202 is on the right of the first display area 201.

Figure 3:
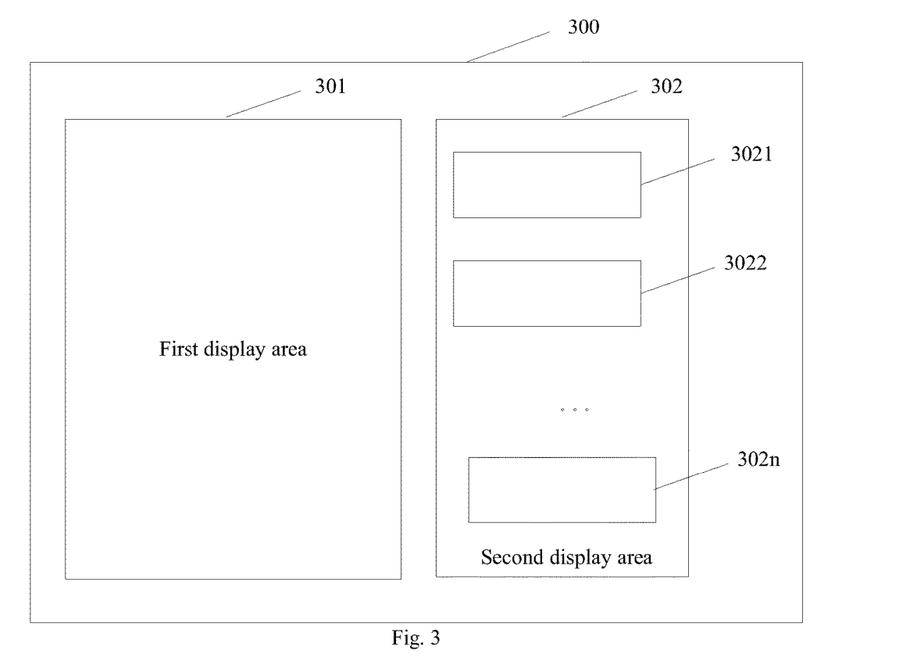
FIG. 3 is a schematic diagram illustrating playing video according to various embodiments of the present disclosure.

FIG. 3 is a schematic diagram illustrating playing video according to various embodiments of the present disclosure.

As shown in FIG. 3, the first display area 301 and the second display area 302 are arranged in parallel within the video playing interface 300, and the second display area 302 is on the right of the first display area 301. The second display area 302 includes multiple display sub-areas, i.e., a display sub-area 3021, a display sub-area 3022, . . . , a display sub-area 302n.

Further, the video file displayed in the first display area 301 includes n video sub-segments with an ordinal relation, such as a video sub-segment 1, a video sub-segment 2, . . . , and a video sub-segment n.

First, the video sub-segment 1 is played completely in the entire first display area 301. After the video sub-segment 1 is played, the additional media information related to the video sub-segment 1 is displayed in the display sub-area 3021 of the second display area 302.

Second, the video sub-segment 2 is played completely in the entire first display area 301. After the video sub-segment 2 is played, the additional media information related to the video sub-segment 2 is displayed in the display sub-area 3022 of the second display area 302.

Then, the video sub-segment 3 is played completely in the entire first display area 301. After the video sub-segment 3 is played, the additional media information related to the video sub-segment 3 is displayed in the display sub-area 3023 of the second display area 302.

Successively, the video sub-segment n is played completely in the entire first display area 301. After the video sub-segment n is played, the additional media information related to the video sub-segment n is displayed in the display sub-area 302n of the second display area 302.

According to an embodiment, after all the video sub-segments have been played in the first display area 301, the additional media information related to each video sub-segment is displayed according to the ordinal relation in the entire second display area 302. That is, after all the video sub-segments are played in the first display area 301, the additional media information related to the video sub-segment 1, the additional media information related to the video sub-segment 2, . . . , the additional media information related to the video sub-segment n are displayed respectively in the entire second display area 302.

Figure 1B:
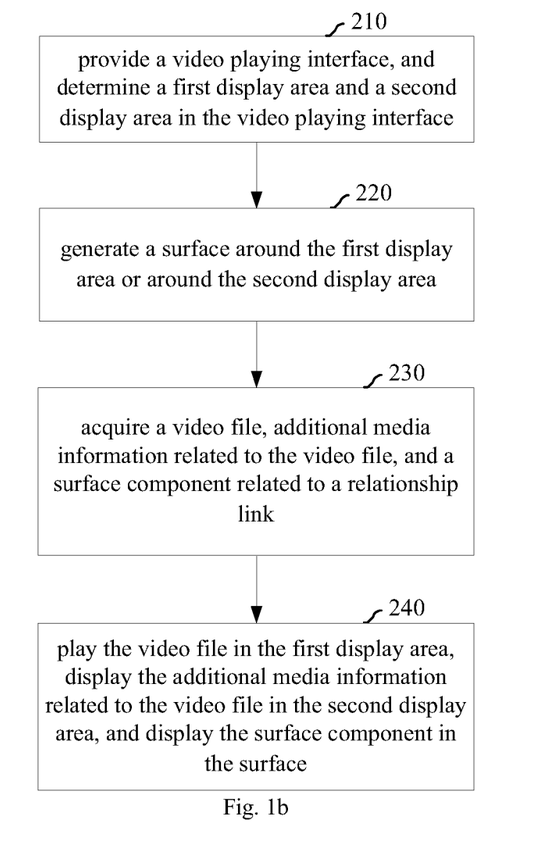
FIG. 1b is a schematic flowchart illustrating a method for playing video according to various embodiments of the present disclosure.

FIG. 1b is a schematic flowchart illustrating a method for playing video according to various embodiments of the present disclosure. As shown in FIG. 1b, the method includes the following processing.

In block 210, provide a video playing interface, and determine a first display area and a second display area in the video playing interface.

According to an embodiment, the first display area is used for playing a video file, while the second display area is used for displaying the additional media information. Thus, the first display area may be larger than the second display area, and the first display area may be located in the main part of the video playing interface.

In block 220, generate a surface around the first display area or around the second display area.

According to an embodiment, the surface is used for displaying the surface component related to the relationship chain. Thus, the area of the surface may be smaller than the first display area, and the surface may overlap partially with the second display area.

In block 230, acquire a video file, additional media information related to the video file, and a surface component related to a relationship chain.

According to an embodiment, a video file provider may upload the video file and the additional media information related to the video file to the server, then the terminal may request and acquire the video file and its corresponding additional media information from the server, or, directly from the video file provider.

According to an embodiment, the additional media information may be generated by the terminal used for playing the video file.

The surface component related to a relationship chain may be acquired from the server, and may include a control related to the relationship chain and/or relationship chain information related to the video file. The relationship chain includes a user, one or more than one friend of the user, and relationship connection(s) between them.

For example, the control related to the relationship chain may include at least one of the following: a trigger control for forwarding to a friend, a control for receiving a friend's comments, a control for reminding a friend to attention, and a control for displaying the number of being forwarded.

The relationship chain information related to the video file may include at least one of the following: an identifier of a video-file source user, a nickname of the video-file source user, an avatar of the video-file source user, an identifier of a friend of the video-file source user, a nickname of the friend of the video-file source user, an avatar of the friend of the video-file source user, and participation and attention information of the friend of the video-file source user.

Further, besides a control related to the relationship chain and relationship chain information related to the video file, the surface component may also include at least one of the following: an identifier of the video file, a two-dimensional code, promotion information, and page connection information of a microblog activity.

In block 240, play the video file in the first display area, display the additional media information related to the video file in the second display area, and display the surface component in the surface.

The video file, the additional media information, and the surface component are played or displayed in different areas. But compared with the time when playing the video file, when displaying the additional media information is not limited according to various embodiments of the present disclosure.

Compared with the time when playing the video file or the time when displaying the additional media information, when displaying the surface component is also not limited according to various embodiments of the present disclosure.

Figure 4A:
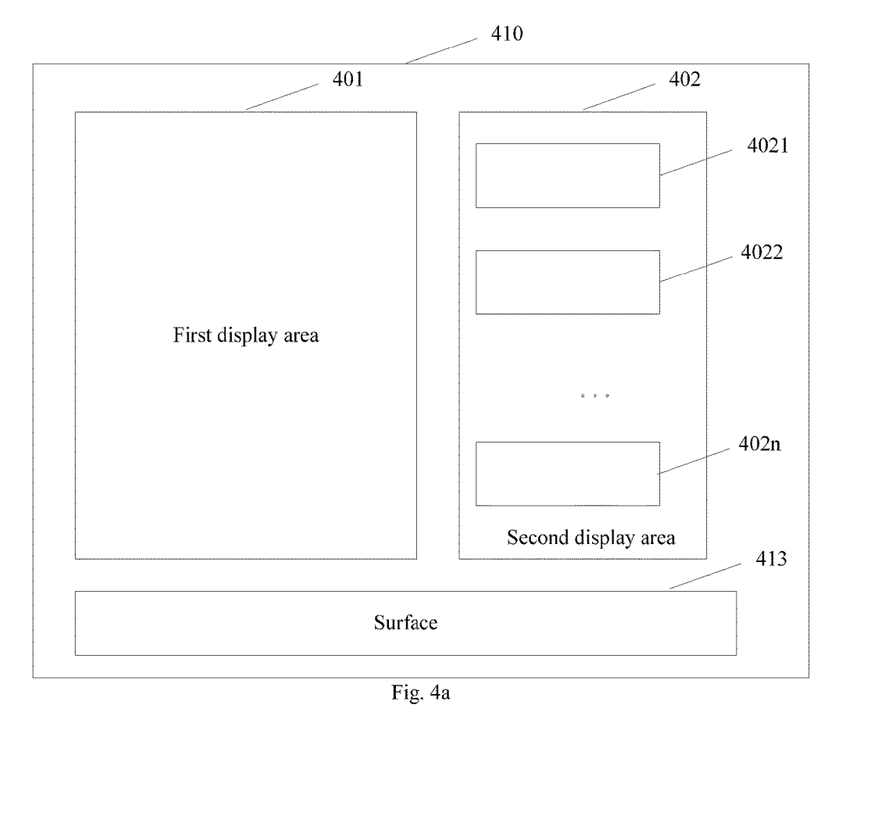
FIG. 4a is a schematic diagram illustrating playing video according to various embodiments of the present disclosure.

FIG. 4a is a schematic diagram illustrating playing video according to various embodiments of the present disclosure.

As shown in FIG. 4a, the first display area 401 and the second display area 402 are arranged in parallel in the video playing interface 410, and the second display area 402 is on the right of the first display area 401. The second display area 402 includes multiple display sub-area, i.e., a display sub-area 4021, a display sub-area 4022, . . . , a display sub-area 402n.

Further, the video file displayed in the first display area 401 includes n video sub-segments with an ordinal relation, such as a video sub-segment 1, a video sub-segment 2, . . . , and a video sub-segment n.

First, the video sub-segment 1 is played completely in the entire first display area 401. After the video sub-segment 1 is played, the additional media information related to the video sub-segment 1 is displayed in the display sub-area 4021 of the second display area 402.

Second, the video sub-segment 2 is played completely in the entire first display area 401. After the video sub-segment 2 is played, the additional media information related to the video sub-segment 2 is displayed in the display sub-area 4022 of the second display area 402.

Then, the video sub-segment 3 is played completely in the entire first display area 401. After the video sub-segment 3 is played, the additional media information related to the video sub-segment 3 is displayed in the display sub-area 4023 of the second display area 402.

Successively, the video sub-segment n is played completely in the entire first display area 401. After the video sub-segment n is played, the additional media information related to the video sub-segment n is displayed in the display sub-area 402n of the second display area 402.

According to an embodiment, after all the video sub-segments are played in the first display area 401, the additional media information related to each video sub-segment is displayed according to the ordinal relation in the entire second display area 402. That is, after all the video sub-segments are played in the first display area 401, the additional media information related to the video sub-segment 1, the additional media information related to the video sub-segment 2, . . . , the additional media information related to the video sub-segment n are displayed respectively in the entire second display area 402.

In addition, besides the first display area 401 and the second display area 402, there is an information display surface 403 (as shown in the bottom of FIG. 4a).

When each video sub-segment is played one by one in the first display area 401, information corresponding to the played video sub-segment is displayed in the information display surface 403 simultaneously. The information may include an identifier of the video sub-segment; a two-dimensional code; promotion information; page connection information of a microblog activity; a control related to a relationship chain, etc.

Or, the information display surface 403 may be a surface for displaying relationship chain information. After all the video sub-segments are played in the first display area 401, some relationship chain edit information may be displayed in the surface for displaying relationship chain information 403, such as a user's avatar, a user's comments, etc. Furthermore, in the surface for displaying relationship chain information 403, the relationship chain information may be displayed dynamically in a format of a marquee, or the relationship chain information may be updated and displayed according to a pre-determined period.

Figure 4B:
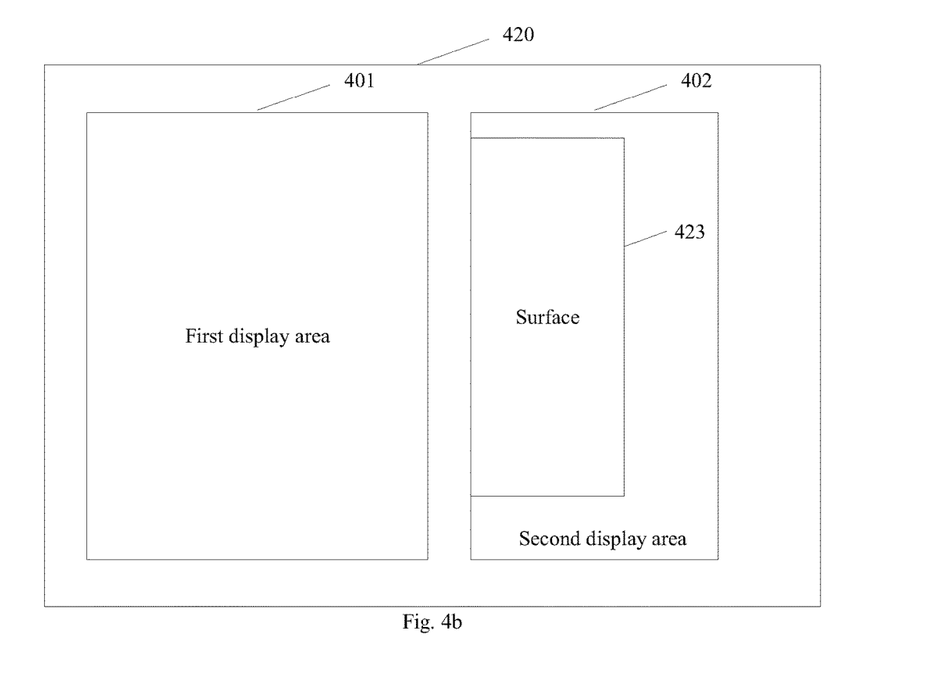
FIG. 4b is a schematic diagram illustrating playing video according to various embodiments of the present disclosure.

According to various embodiments of the present disclosure, the location of the information display surface may be various formats. Besides at the bottom of the first display area 401 and the second display area 402 as shown in FIG. 4a, as shown in FIG. 4b, in the video playing interface 420, the surface 423 for displaying the surface component may be located above the second display area 402 in a format of a surface, and be overlapped partially with the second display area 402. The detailed formats are not limited in the present disclosure.

Based on the above description, embodiments of the present disclosure also provide an apparatus for playing video.

Figure 5:
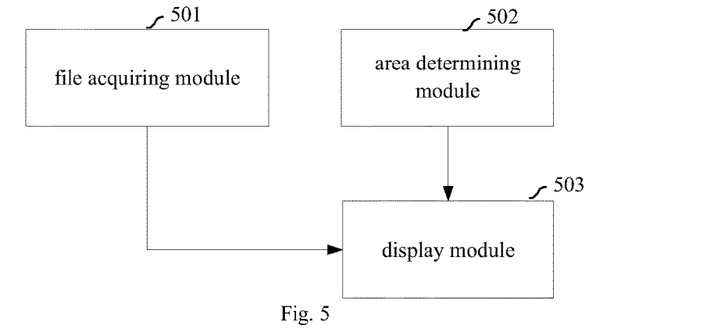
FIG. 5 is a schematic diagram illustrating a structure of an apparatus for playing video according to various embodiments of the present disclosure.

FIG. 5 is a schematic diagram illustrating a structure of an apparatus for playing video according to various embodiments of the present disclosure.

As shown in FIG. 5, the apparatus for playing video includes a file acquiring module 501, an area determining module 502, and a display module 503.

The file acquiring module 501 is to acquire a video file, additional media information related to the video file, and a surface component related to a relationship chain;

the area determining module 502 is to determine a first display area and a second display area in the video playing interface;

the display module 503 is to provide a video playing interface, playing the video file in the first display area, and displaying the additional media information related to the video file in the second display area.

According to an embodiment, the second display area is located around the first display area, the display module is to:

after the video file is played in the first display area, display the additional media information related to the video file in the second display area; or when the video file is played in the first display area, display the additional media information related to the video file in the second display area at the same time; or before the video file is played in the first display area, display the additional media information related to the video file in the second display area.

According to an embodiment, the apparatus for playing video further includes an additional surface display module (not shown in FIG. 5).

The additional surface display module is to generate a surface around the first display area or around the second display area, and display the surface component in the surface. The surface component related to the relationship chain comprises at least one of the following: an identifier of the video file, a two-dimensional code, promotion information, page connection information of a microblog activity, a control related to the relationship chain, relationship chain information related to the video file. The control related to the relationship chain comprises at least one of the following: a trigger control for forwarding to a friend, a control for receiving a friend's comments, a control for reminding a friend to attention, and a control for displaying the number of being forwarded. The relationship chain information related to the video file comprises at least one of the following: an identifier of a video-file source user, a nickname of the video-file source user, an avatar of the video-file source user, an identifier of a friend of the video-file source user, a nickname of the friend of the video-file source user, an avatar of the friend of the video-file source user, and participation and attention information of the friend of the video-file source user.

According to an embodiment, the video file comprises at least two video sub-segments with an ordinal relation;

the display module 503 is to play the video sub-segments in the first display area according to the ordinal relation; display the additional media information related to the video sub-segments according to the ordinal relation in the second display area; after all the video sub-segments are played in the first display area, display the additional media information related to the video sub-segments circularly according to the ordinal relation in the second display area.

According to an embodiment, the second display area is located around the first display area, the additional media information related to the video file comprises text information and/or image information related to the video file;

the display module 503 is to generate a second surface in the second display area; display the additional media information related to the video file in the second surface.

Based on the above description, embodiments of the present disclosure also provide a system for playing video.

Figure 6:
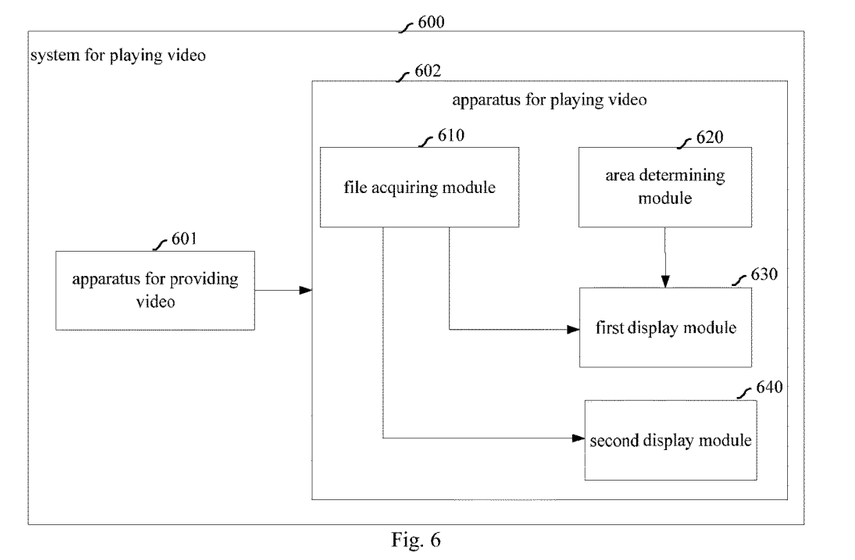
FIG. 6 is a schematic diagram illustrating a structure of a system for playing video according to various embodiments of the present disclosure.

FIG. 6 is a schematic diagram illustrating a structure of a system for playing video according to various embodiments of the present disclosure.

As shown in FIG. 6, the system for playing video 600 includes an apparatus for providing video 601 and an apparatus for playing video 602.

The apparatus for providing video 601 is to provide a video file and additional media information related to the video file to the apparatus for playing video 602.

According to an embodiment, the apparatus for providing video 601 may be a server, or any other kind of apparatus or device which may provide a video file and additional media information related to the video file to the apparatus for playing video 602.

The apparatus for playing video 602 includes a file acquiring module 610, an area determining module 620, a first display module 630, and a second display module 640.

The file acquiring module 610 is to acquire a video file, additional media information related to the video file, and a surface component related to a relationship chain;

The area determining module 620 is to determine a first display area and a second display area in the video playing interface;

The first display module 630 is to provide a video playing interface, playing the video file in the first display area, and displaying the additional media information related to the video file in the second display area;

The second display module 640 is to generate a surface around the first display area or around the second display area, and display the surface component in the surface.

According to an embodiment, the second display area is located around the first display area, the first display module 630 is to:

after the video file is played in the first display area, display the additional media information related to the video file in the second display area; or when the video file is played in the first display area, display the additional media information related to the video file in the second display area at the same time; or before the video file is played in the first display area, display the additional media information related to the video file in the second display area.

According to an embodiment, the surface component related to the relationship chain comprises at least one of the following: an identifier of the video file, a two-dimensional code, promotion information, page connection information of a microblog activity, a control related to the relationship chain, relationship chain information related to the video file. The control related to the relationship chain comprises at least one of the following: a trigger control for forwarding to a friend, a control for receiving a friend's comments, a control for reminding a friend to attention, and a control for displaying the number of being forwarded.

The relationship chain information related to the video file comprises at least one of the following: an identifier of a video-file source user, a nickname of the video-file source user, an avatar of the video-file source user, an identifier of a friend of the video-file source user, a nickname of the friend of the video-file source user, an avatar of the friend of the video-file source user, and participation and attention information of the friend of the video-file source user.

According to an embodiment, the video file comprises at least two video sub-segments with an ordinal relation;

the first display module 630 is to play the video sub-segments in the first display area according to the ordinal relation; display the additional media information related to the video sub-segments according to the ordinal relation in the second display area; after all the video sub-segments are played in the first display area, display the additional media information related to the video sub-segments circularly according to the ordinal relation in the second display area.

According to an embodiment, the file acquiring module 610 is further to acquire correspondence between the video sub-segments and the additional media information related to the video sub-segments.

According to an embodiment, the second display area is located around the first display area, the additional media information related to the video file comprises text information and/or image information related to the video file;

the first display module 630 is to generate a second surface in the second display area; display the additional media information related to the video file in the second surface.

In some cases, the apparatus for playing video according to various embodiments of the present disclosure may be integrated into any terminal. The terminal may include but not be limited to a functional phone, a smart phone, a hand-held computer, a personal computer (PC), a tablet or personal digital assistant (PDA), etc.

Although embodiments of terminal are listed above, those skilled in the art may appreciate that, the listing is only for illustration purpose, which does not cause any limitation to the protection scope of the present disclosure. The terminal may be suitable for any operation system in the smart terminal. The operation system may include but not be limited to Android, Palm OS, Symbian, Windows mobile, Linux, iPhone OS, Black Berry OS 6.0, Windows Phone series, etc.

According to an embodiment, the terminal may use Android operation system, and more specifically, different versions of Android, including but not limited to: Android Beta, Android 1.0, Android 1.5, Android 1.6, Android 2.0/2.1, Android 2.2, Android 2.3, Android 3.0, Android 4.0, Jelly Bean, Android 4.1, etc.

Those skilled in the art may appreciate that, embodiments of the present disclosure are not limited to the versions of Android as listed above, which may use any version under the architecture of Android software.

Further, the method and apparatus for playing video according to various embodiments of the present disclosure may be implemented in many forms.

For example, according to an API under a certain specification, the method for playing video can be written as a plug-in to be installed into a personal computer, or a mobile terminal, etc. The plug-in may be encapsulated into an application program to be downloaded by the user itself. When being written as a plug-in, the formats may be ocx, dll, cab, etc. Or, the method for playing video according to various embodiments of the present disclosure may be implemented by using a Flash plug-in, a RealPlayer plug-in, a MMS plug-in, a MIDI stave plug-in, an ActiveX plug-in, etc.

The method for playing video according to various embodiments of the present disclosure may be stored in various storage mediums by using instructions or a set of instructions. The storage mediums include but do not be limited to: a floppy disk, a magnetic disk, DVD, a hard disk, flash memory, U disk, CF card, SD card, MMC card, SM card, memory stick, xD card, etc.

The method for playing video according to various embodiments of the present disclosure may be stored in storage mediums based on Nand flash, e.g., U disk, CF card, SD card, SDHC card, MMC card, SM card, memory stick, xD card, etc.

Figure 7:
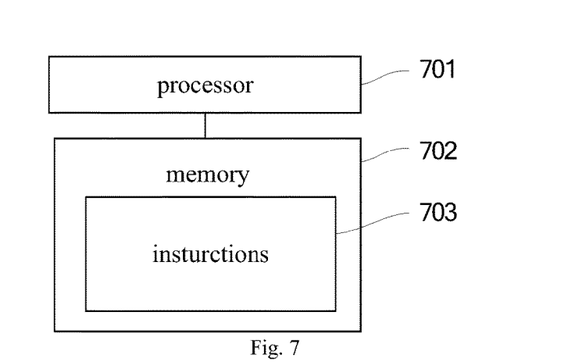
FIG. 7 is a schematic diagram illustrating a structure of a device according to various embodiments of the present disclosure.

FIG. 7 is a schematic diagram illustrating a structure of a device according to various embodiments of the present disclosure. As shown in FIG. 7, the device comprises one or more processors 701, and a memory 702 for storing instructions 703 to be executed by the one or more processors 701, wherein the instructions 703 are configured to implement corresponding modules as described above. When one or more processors 701 communicate with a memory 702 to read and execute instructions, the device can implement corresponding functions.

As described above, according to various embodiments of the present disclosure, by providing a video playing interface; determining a first display area and a second display area in the video playing interface; generating a surface around the first display area or around the second display area; acquiring a video file, additional media information related to the video file, and a surface component related to a relationship chain; playing the video file in the first display area, displaying the additional media information related to the video file in the second display area, and displaying the surface component in the surface, content of the video file can be displayed further by combination with the additional media information, even when the video playing time is shortened, medium exposure rate can be guaranteed, so that the video playing efficiency can be improved. In addition, the user may not only receive the video passively, rather socialized elements are introduced into the video, for example, ID, nickname and avatar of the user, or, participation and attention information of a friend, so that the user' attention and propagation about the video is improved, and the interaction efficiency is enhanced.

The foregoing is only preferred embodiments of the present disclosure and is not used to limit the protection scope of the present disclosure. Any modification, equivalent substitution and improvement are within the protection scope of the present disclosure.

The invention claimed is:
1. A method for playing video, comprising:
providing a video playing interface;
determining a first display area and a second display area in the video playing interface;
generating a surface around the first display area or around the second display area;
acquiring a video file, additional media information related to the video file, and a surface component related to a relationship chain;
playing the video file in the first display area, displaying the additional media information related to the video file in the second display area, and displaying the surface component in the surface;
wherein the second display area is located around the first display area, the additional media information related to the video file comprises text information and/or image information related to the video file;
displaying the additional media information related to the video file in the second display area comprises: generating a second surface in the second display area;

displaying the additional media information related to the video file in the second surface;

the video file comprises at least two video sub-segments with an ordinal relation; and playing the video file in the first display area, displaying the additional media information related to the video file in the second display area comprises: playing the video sub-segments in the first display area according to the ordinal relation; displaying the additional media information related to the video sub-segments according to the ordinal relation in the second display area; and after all the video sub-segments are played in the first display area, displaying the additional media information related to the video sub-segments circularly according to the ordinal relation in the second display area.

2. The method of claim 1, wherein the second display area is located around the first display area, displaying the additional media information related to the video file in the second display area comprises:

after the video file is played in the first display area, displaying the additional media information related to the video file in the second display area; or when the video file is played in the first display area, displaying the additional media information related to the video file in the second display area at the same time; or before the video file is played in the first display area, displaying the additional media information related to the video file in the second display area.

3. The method of claim 1, wherein the surface component related to the relationship chain comprises a control related to the relationship chain and/or relationship chain information related to the video file.

4. The method of claim 3, wherein the control related to the relationship chain comprises at least one of the following: a trigger control for forwarding to a friend, a control for receiving a friend's comments, a control for reminding a friend to attention, and a control for displaying the number of being forwarded;

the relationship chain information related to the video file comprises at least one of the following: an identifier of a video-file source user, a nickname of the video-file source user, an avatar of the video-file source user, an identifier of a friend of the video-file source user, a nickname of the friend of the video-file source user, an avatar of the friend of the video-file source user, and participation and attention information of the friend of the video-file source user.

5. The method of claim 3, wherein the surface component related to the relationship chain further comprises at least one of the following: an identifier of the video file, a two-dimensional code, promotion information, and page connection information of a microblog activity.

6. The method of claim 1, further comprising:

acquiring correspondence between the video sub-segments and the additional media information related to the video sub-segments.

7. A device, comprising one or more processors, and a memory for storing instructions to be executed by the one or more processors, wherein the instructions are configured to:

acquire a video file, additional media information related to the video file, and a surface component related to a relationship chain;

determine a first display area and a second display area in the video playing interface;

provide a video playing interface, play the video file in the first display area, and display the additional media information related to the video file in the second display area;

generate a surface around the first display area or around the second display area, and display the surface component in the surface;

wherein the second display area is located around the first display area, the additional media information related to the video file comprises text information and/or image information related to the video file;

the instructions are configured to generate a second surface in the second display area;

display the additional media information related to the video file in the second surface;

the video file comprises at least two video sub-segments with an ordinal relation; and the instructions are configured to play the video sub-segments in the first display area according to the ordinal relation; display the additional media information related to the video sub-segments according to the ordinal relation in the second display area; after all the video sub-segments are played in the first display area, display the additional media information related to the video sub-segments circularly according to the ordinal relation in the second display area.

8. The device of claim 7, wherein the second display area is located around the first display area, the instructions are configured to:

after the video file is played in the first display area, display the additional media information related to the video file in the second display area; or when the video file is played in the first display area, display the additional media information related to the video file in the second display area at the same time; or before the video file is played in the first display area, display the additional media information related to the video file in the second display area.

9. The device of claim 7, wherein the surface component related to the relationship chain comprises a control related to the relationship chain and/or relationship chain information related to the video file.

10. The device of claim 9, wherein the control related to the relationship chain comprises at least one of the following: a trigger control for forwarding to a friend, a control for receiving a friend's comments, a control for reminding a friend to attention, and a control for displaying the number of being forwarded;

the relationship chain information related to the video file comprises at least one of the following: an identifier of a video-file source user, a nickname of the video-file source user, an avatar of the video-file source user, an identifier of a friend of the video-file source user, a nickname of the friend of the video-file source user, an avatar of the friend of the video-file source user, and participation and attention information of the friend of the video-file source user.

11. The device of claim 9, wherein the surface component related to the relationship chain further comprises at least one of the following: an identifier of the video file, a two-dimensional code, promotion information, and page connection information of a microblog activity.

12. The device of claim 7, wherein the instructions are further configured to acquire correspondence between the video sub-segments and the additional media information related to the video sub-segments.

13. A non-transitory storage medium, configured to store computer-executable instructions, wherein the computer-executable instructions are configured to:

provide a video playing interface;

determine a first display area and a second display area in the video playing interface;

generate a surface around the first display area or around the second display area;

acquire a video file, additional media information related to the video file, and a surface component related to a relationship chain;

play the video file in the first display area, display the additional media information related to the video file in the second display area, and display the surface component in the surface;

wherein the second display area is located around the first display area, the additional media information related to the video file comprises text information and/or image information related to the video file;

the instructions are further configured to: generate a second surface in the second display area, display the additional media information related to the video file in the second surface;

the video file comprises at least two video sub-segments with an ordinal relation; and the instructions are configured to play the video sub-segments in the first display area according to the ordinal relation; display the additional media information related to the video sub-segments according to the ordinal relation in the second display area; after all the video sub-segments are played in the first display area, display the additional media information related to the video sub-segments circularly according to the ordinal relation in the second display area.

* * * * *